United States Patent
Theodosis et al.

(10) Patent No.: US 11,104,345 B2
(45) Date of Patent: Aug. 31, 2021

(54) METHODS, SYSTEMS, AND MEDIA FOR DETERMINING CHARACTERISTICS OF ROADS

(71) Applicant: Rivian IP Holdings, LLC, Plymouth, MI (US)

(72) Inventors: Paul Theodosis, Dublin, CA (US); Sabarish Gurusubramanian, San Jose, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 23 days.

(21) Appl. No.: 15/956,351

(22) Filed: Apr. 18, 2018

(65) Prior Publication Data

US 2019/0322282 A1    Oct. 24, 2019

(51) Int. Cl.
| | |
|---|---|
| *B60W 40/06* | (2012.01) |
| *B60W 10/22* | (2006.01) |
| *G06T 7/246* | (2017.01) |
| *G06K 9/00* | (2006.01) |

(52) U.S. Cl.
CPC ............ *B60W 40/06* (2013.01); *B60W 10/22* (2013.01); *G06K 9/00825* (2013.01); *G06T 7/246* (2017.01); *B60W 2554/00* (2020.02); *B60W 2554/80* (2020.02)

(58) Field of Classification Search
None
See application file for complete search history.

(56) References Cited

U.S. PATENT DOCUMENTS

| | | | |
|---|---|---|---|
| 10,106,167 B2 * | 10/2018 | Mohamed | B60W 40/06 |
| 10,275,662 B1 * | 4/2019 | Askeland | G06K 9/00791 |
| 10,422,649 B2 * | 9/2019 | Engelman | G01C 21/34 |
| 2008/0294315 A1 | 11/2008 | Breed | |
| 2014/0088855 A1 | 3/2014 | Ferguson | |
| 2014/0195112 A1 | 7/2014 | Lu et al. | |
| 2014/0297116 A1 | 10/2014 | Anderson et al. | |
| 2016/0171315 A1 * | 6/2016 | Yi | G06K 9/00791 |
| | | | 382/154 |
| 2016/0318365 A1 | 11/2016 | Sivaraman | |
| 2017/0163997 A1 * | 6/2017 | Haruna | H04N 19/167 |

(Continued)

OTHER PUBLICATIONS

International Search Report and Written Opinion dated Jul. 1, 2019 in International Patent Application No. PCT/US2019/027940.

*Primary Examiner* — Abdhesh K Jha
(74) *Attorney, Agent, or Firm* — Clements Bernard Walker; Christopher L. Bernard (57) ABSTRACT

Methods, systems, and media for determining characteristics of roads are provided. In some embodiments, the method comprises: receiving, at a first time point, first camera information from a camera associated with a vehicle; identifying a first position of a feature of an object in front of the vehicle based on the first camera information; receiving, at an additional time point, additional camera information from the camera; identifying an updated position of the feature of the object in front of the vehicle based on the additional camera information; determining a relative motion of the feature of the object in front of the vehicle based on the first position and the updated position; and determining a characteristic of a road the vehicle is on based on the relative motion of the feature of the object in front of the vehicle.

21 Claims, 3 Drawing Sheets

(56) References Cited

U.S. PATENT DOCUMENTS

| | | | |
|---|---|---|---|
| 2019/0023095 A1* | 1/2019 | Ficca | B60G 17/018 |
| 2019/0088135 A1* | 3/2019 | Do | G08G 1/096791 |
| 2019/0279508 A1* | 9/2019 | Wang | H04W 4/80 |
| 2019/0283753 A1* | 9/2019 | Tatourian | G08G 1/096775 |

* cited by examiner

METHODS, SYSTEMS, AND MEDIA FOR DETERMINING CHARACTERISTICS OF ROADS

TECHNICAL FIELD

The disclosed subject matter relates to methods, systems, and media for determining characteristics of roads.

BACKGROUND

It can be useful to determine characteristics of a road that a vehicle is traveling on. For example, as autonomous and semi-autonomous vehicles become more prevalent, it can be useful for a vehicle to determine if there is an object in the road that the vehicle will encounter. As another example, determining that there is an upcoming pot hole or speed bump can be used to adjust a suspension system of the vehicle. However, it can be difficult to determine characteristics of a road. For example, although sensor based systems, such as a lidar system or a radar system, can be used, such systems can be expensive.

Accordingly, it is desirable to provide new methods, systems, and media for determining characteristics of roads.

SUMMARY

Methods, systems, and media for determining characteristics of roads are provided.

In accordance with some embodiments of the disclosed subject matter, a method for determining characteristics of roads is provided, the method comprising: receiving, at a first time point, first camera information from a camera associated with a vehicle; identifying a first position of a feature of an object in front of the vehicle based on the first camera information; receiving, at an additional time point, additional camera information from the camera; identifying an updated position of the feature of the object in front of the vehicle based on the additional camera information; determining a relative motion of the feature of the object in front of the vehicle based on the first position and the updated position; and determining a characteristic of a road the vehicle is on based on the relative motion of the feature of the object in front of the vehicle.

In accordance with some embodiments of the disclosed subject matter, a system for determining characteristics of roads is provided, the system comprising: a hardware processor that is programmed to: receive, at a first time point, first camera information from a camera associated with a vehicle; identify a first position of a feature of an object in front of the vehicle based on the first camera information; receive, at an additional time point, additional camera information from the camera; identify an updated position of the feature of the object in front of the vehicle based on the additional camera information; determine a relative motion of the feature of the object in front of the vehicle based on the first position and the updated position; and determine a characteristic of a road the vehicle is on based on the relative motion of the feature of the object in front of the vehicle.

In accordance with some embodiments of the disclosed subject matter, a non-transitory computer-readable medium containing computer executable instructions that, when executed by a processor, cause the processor to perform a method for determining characteristics of roads is provided, the method comprising: receiving, at a first time point, first camera information from a camera associated with a vehicle; identifying a first position of a feature of an object in front of the vehicle based on the first camera information; receiving, at an additional time point, additional camera information from the camera; identifying an updated position of the feature of the object in front of the vehicle based on the additional camera information; determining a relative motion of the feature of the object in front of the vehicle based on the first position and the updated position; and determining a characteristic of a road the vehicle is on based on the relative motion of the feature of the object in front of the vehicle.

In accordance with some embodiments of the disclosed subject matter, a system for determining characteristics of roads is provided, the system comprising: means for receiving, at a first time point, first camera information from a camera associated with a vehicle; mean for identifying a first position of a feature of an object in front of the vehicle based on the first camera information; means for receiving, at an additional time point, additional camera information from the camera; means for identifying an updated position of the feature of the object in front of the vehicle based on the additional camera information; means for determining a relative motion of the feature of the object in front of the vehicle based on the first position and the updated position; and means for determining a characteristic of a road the vehicle is on based on the relative motion of the feature of the object in front of the vehicle.

In some embodiments, the object in front of the vehicle is a second vehicle.

In some embodiments, the feature of the object in front of the vehicle is a taillight of the second vehicle.

In some embodiments, the surface characteristic of the road is an irregularity of a surface of the road.

In some embodiments, the characteristic of the road is a change in terrain.

In some embodiments, the system further comprises means for changing a parameter of the vehicle based on the characteristic of the road.

In some embodiments, the means for changing the parameter of the vehicle comprises means for changing a suspension parameter of the vehicle.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for determining characteristics of roads are provided.

In some embodiments, the mechanisms described herein can determine a characteristic of a road that a vehicle is traveling on. For example, in some embodiments, the mechanisms can determine a surface characteristic of a road a vehicle is traveling on, such as an upcoming irregularity in the surface of the road (e.g., an object on the road, a pothole, a speed bump, and/or any other suitable irregularity). As another example, in some embodiments, the mechanisms can identify a ground plane associated with the road, such as a terrain or a change in terrain (e.g., an upcoming uphill, an upcoming downhill, an upcoming turn, and/or any other suitable change in terrain). In some embodiments, the mechanisms can then adjust a system of the vehicle, such as a suspension system of the vehicle, prior to the vehicle encountering the surface characteristic of the road, the terrain, and/or the change in terrain.

In some embodiments, the mechanisms can determine a characteristic of a road a vehicle is traveling on using any suitable information. For example, in some embodiments, the mechanisms can use a camera of a vehicle (e.g., a front camera, and/or any other suitable camera) to capture a series of images (e.g., two images, ten images, twenty images, and/or any other suitable number of images) of a feature of an object in front of the vehicle, and can determine a relative motion of the feature of the object in front of the vehicle as the vehicle encounters a characteristic of a road (e.g., as the object passes over a pothole, as the object goes up an upcoming hill, and/or in any other suitable manner). The mechanisms can then determine a characteristic of the road based on the relative motion. In some embodiments, the object in front of the vehicle can be any suitable object, such as a second vehicle traveling in front of the vehicle. In some embodiments, a feature of an object can be a part of the object. For example, in an instance where the object is a second vehicle traveling in front of the vehicle, the feature of the object can be a part of the second vehicle, such as a taillight, a license plate of the second vehicle, and/or any other suitable part of the second vehicle. In some embodiments, a feature of an object can have a relative motion that can be correlated to a characteristic of a road. For example, in an instance where a surface characteristic of a road is a speed bump, a relative motion of a feature of an object (e.g., a taillight of a second vehicle in front of the vehicle) can be up and down over a particular time range (e.g., one second, and/or any other suitable duration) as the object moves over the speed bump. In some embodiments, the mechanisms can determine a characteristic of a road using any suitable technique or combination of techniques. For example, in some embodiments a relative motion of a feature of an object in front of a vehicle can be used as an input to a machine learning algorithm (e.g., a classifier, and/or any other suitable type of algorithm), which can output a characteristic of a road (e.g., pothole, speed bump, uphill, downhill, turn, and/or any other suitable surface characteristic of a road).

Figure 1:
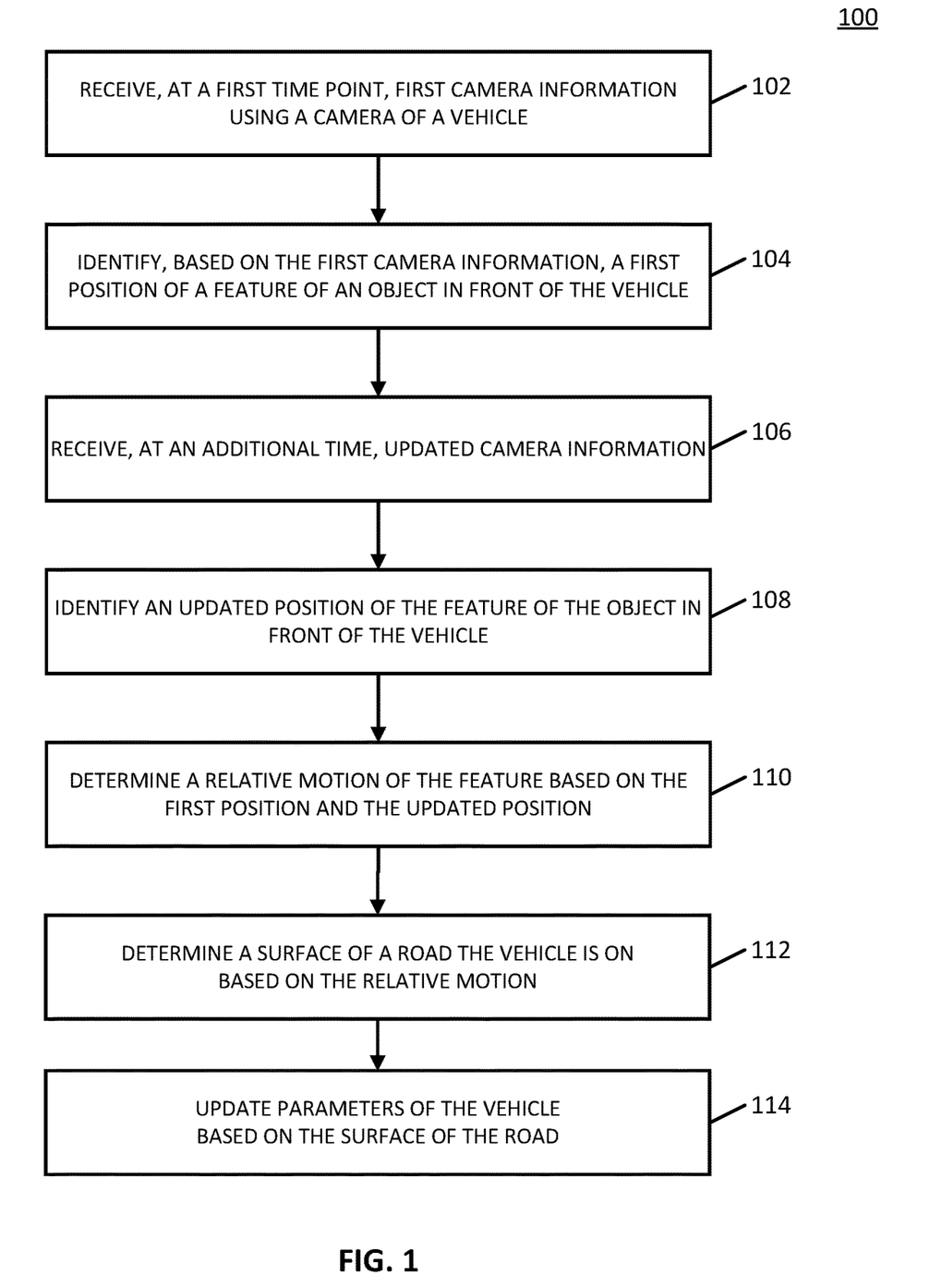
FIG. 1 shows an example of a process for determining characteristics of roads in accordance with some embodiments of the disclosed subject matter.

Turning to FIG. 1, an example 100 of a process for determining characteristics of a road that can be used in accordance with some embodiments of the disclosed subject matter is shown. In some embodiments, blocks of process 100 can be executed on a vehicle computer of a vehicle.

Process 100 can begin by receiving and/or capturing, at a first time point, camera information using a camera of a vehicle. In some embodiments, the camera information can be received from any suitable camera (e.g., a front camera on the vehicle, a side camera on the vehicle, a rear camera on the vehicle, and/or any other suitable camera). In some embodiments, the camera information can include any suitable number of images (e.g., one, two, five, ten, twenty, and/or any other suitable number of images) and the images can be captured over any suitable time range (e.g., one millisecond, half a second, one second, and/or any other suitable time range).

At 104, process 100 can identify a position of a feature of an object in front of the vehicle. In some embodiments, the object can be an object that is moving in front of the vehicle, such as a second vehicle (e.g., a car, a truck, a bike, a motorcycle, and/or any other suitable vehicle). In some embodiments, the feature of the object can be a part of the object. For example, in an instance where the object is a second vehicle, the feature can be a taillight of the second vehicle, a license plate of the second vehicle, a logo on the second vehicle, and/or any other suitable feature. In some embodiments, process 100 can identify the position of the feature of the object using any suitable technique or combination of techniques. For example, in some embodiments, process 100 can locate the object from the camera image(s) captured above at block 102 using any suitable image recognition technique(s). In some embodiments, process 100 can then determine a position of the feature of the object within the camera image(s). For example, in some embodiments, process 100 can determine a coordinate (e.g., an (x, y) coordinate, and/or any other suitable coordinates) of a center of the feature.

At 106, process 100 can receive and/or capture additional camera information. For example, in some embodiments, process 100 can capture additional images using the camera associated with the vehicle used at block 102. Similarly to what is described above in connection with block 102, any suitable number of images (e.g., one, two, five, ten, twenty, and/or any other suitable number) can be captured over any suitable time range (e.g., one millisecond, half a second, one second, and/or any other suitable time range). In some embodiments, any suitable time duration can separate the camera information captured at block 102 and the camera information captured at block 106 (e.g., half a second, one second, and/or any other suitable duration). For example, in some embodiments, blocks 102 and 106 can be repeated at a predetermined frequency (e.g., once per half second, once per second, and/or any other suitable predetermined frequency). As a more particular example, in some embodiments, the camera associated with the vehicle can be configured to repeatedly captured images at a predetermined frequency, and the images can be analyzed to identify an object in front of the vehicle (e.g., a second vehicle in front of the vehicle, and/or any other suitable object) and/or a feature of the object in front of the vehicle, as described above in connection with block 104

At 108, process 100 can identify an updated position of the feature of the object in front of the vehicle based on the additional camera information received or captured at block 106. In some embodiments, process 100 can identify the updated position of the feature of the object using any suitable technique(s). For example, similarly to what is described above in connection with block 104, process 100 can detect the feature of the object within the captured camera images using any suitable image recognition technique(s), and can then determine a position of the feature of the object within the camera image(s) (e.g., by determining a coordinate of the feature, and/or in any other suitable manner). In some embodiments, process 100 can align the object within the camera image(s) in any suitable manner. For example, in some embodiments, process 100 can crop, rotate, shift, and/or otherwise shift the camera image(s) in any suitable manner such that the object is located at the same or at a similar position in the camera image(s) captured at block 106 compared to the camera image(s) captured at block 102. As a more particular example, if the object (e.g., a second vehicle, and/or any other suitable object) is centered within the camera image(s) captured at block 102 and is offset (e.g., offset to the left, offset to the right, and/or offset in any other suitable direction) in the camera image(s) captured at block 106, process 100 can shift and/or otherwise manipulate any of the camera images such that the object is located at a similar position across all camera images.

Note that, in some embodiments, process 100 can determine whether the object and/or the feature of the object of block 104 is visible in the camera image(s) captured at block 106 prior to determining the updated position of the feature of the object at block 108. For example, in an instance where the object is a particular vehicle (e.g., a red car, a pickup truck, and/or any other suitable object), process 100 can determine whether the particular vehicle is visible in the camera image(s) captured at block 106. As another example, in some embodiments, in an instance where the feature of the object is a particular part of the object (e.g., a taillight of a vehicle, a license plate of the vehicle, a logo of the vehicle, and/or any other suitable part of the object), process 100 can determine whether the particular part of the object is visible in the camera image(s) captured at block 106.

At 110, process 100 can determine a relative motion of the feature of the object based on the first position of the feature of the object determined at block 104 and the updated position of the feature of the object determined at block 108. In some embodiments, process 100 can determine relative motion in any suitable plane of motion. For example, in some embodiments, process 100 can determine a vertical motion of the feature of the object. As a more particular example, in an instance where the feature of the object (e.g., a taillight of a second vehicle, a license plate of a second vehicle, a logo of a second vehicle, and/or any other suitable feature of an object) is determined to be at a particular y-coordinate while at the first position determined at block 104, and at a second y-coordinate while at the updated position determined at block 108, process 100 can determine that the vertical motion of the feature is a difference between the updated position and the first position. In some embodiments, process 100 can determine a relative motion in any other suitable plane, and/or in any combination of multiple planes of motion. For example, in some embodiments, process 100 can determine a relative motion of the feature of the object in both a horizontal and a vertical plane of motion.

Note that, in some embodiments, the determined relative motion of the feature of the object can be one movement and/or any suitable combination of movements. For example, in some embodiments, process 100 can determine that the feature of the object moved up. As another example, in some embodiments, process 100 can determine that the feature of the object moved up and subsequently moved down. As yet another example, in some embodiments, process 100 can determine that the feature of the object moved left. As still another example, in some embodiments, process 100 can determine that the feature of the object moved left and up simultaneously. In some embodiments, the relative motion can be represented in any suitable manner. For example, in some embodiments, the relative motion can be represented as a vector or matrix that indicates a change in position over time. As a more particular example, in an instance where process 100 determines that a first position of a feature of an object is (0, 1) in a first camera image, that a second position of the feature of the object is (0, 2) in a second camera image, and that a third position of the feature of the object is (0, 1) in a third camera image, process 100 can determine that a relative motion of the feature of the object is: [(0, 1), (0, −1)], thereby indicating that the feature of the object moved up by a particular magnitude and then subsequently moved down by the same magnitude. Note that, in some such embodiments, a time between successive elements of the vector or matrix can be a set predetermined time, representing, for example, a predetermined time between images captured by the camera, as described above at blocks 102 and 106. Additionally, note that, in some embodiments, any suitable number of images spanning any suitable time can be used to determine the relative motion of the feature of the object.

Note that, in some embodiments, process 100 can correct a relative motion of the feature of the object using a movement and/or acceleration of the vehicle. For example, in some embodiments, process 100 can determine a motion of the vehicle using an accelerometer associated with the vehicle, and can subtract the motion of the vehicle from the determined relative motion of the feature of the object in front of the vehicle, thereby accounting for the observed relative motion of the feature of the object that is due to motion of the vehicle itself. As a more particular example, in an instance where process 100 determines a vertical motion of the feature of the object in front of the vehicle (e.g., a taillight of a second vehicle in front of the vehicle) as it moves over a surface irregularity of the road (e.g., a speed bump, pothole, and/or any other suitable irregularity), process 100 can subtract a vertical motion of the vehicle corresponding to the time(s) the images were captured from the vertical motion of the feature of the object in front of the vehicle.

Process 100 can determine a characteristic of a road the vehicle is on based on the relative motion of the feature of the object in front of the vehicle at 112. For example, in some embodiments, the characteristic can indicate an abnormality of a road surface, such as a pothole, a speed bump, and/or any other suitable abnormality in the road surface. As another example, in some embodiments, the characteristic can include information about a ground plane of the road, such as terrain change in the road. As a more particular example, in some embodiments, the characteristic of the road can include a terrain change such as an uphill, a downhill, a turn, and/or any other suitable terrain change. Note that, in some embodiments, because the object is an object in front of the vehicle, the characteristic of the road can be an upcoming abnormality in the road or change in terrain that the vehicle will subsequently encounter. In some embodiments, the characteristic of the road can cause a predictable relative motion of the feature of the object as it moves along the road, which can be used by process 100 to determine the characteristic of the road. For example, in an instance where the characteristic of the road includes a speed bump and where the feature of the object is a part of a second vehicle in front of the vehicle (e.g., a taillight of the second vehicle, a license plate of the second vehicle, a logo of the second vehicle, and/or any other suitable part of the second vehicle), the relative motion of the part of the second vehicle can be a movement up and a subsequent movement down as the second vehicle goes over the speed bump. As another example, in an instance where the characteristic of the road includes an uphill terrain and where the feature of the object is a part of a second vehicle in front of the vehicle (e.g., a taillight of the second vehicle, a license plate of the second vehicle, a logo of the second vehicle, and/or any other suitable part of the second vehicle), the relative motion of the part of the second vehicle can be a movement upward as the second vehicle moves up the hill.

In some embodiments, process 100 can determine the surface characteristics of the road using any suitable technique or combination of techniques. For example, in some embodiments, process 100 can use the relative motion of the feature of the object as an input to any suitable machine learning algorithm, where the output is a characteristic of the road. As a more particular example, in some embodiments, the machine learning algorithm can include a classification algorithm (e.g., a Naïve Bayes algorithm, a Support Vector Machine, a logistic regression, a nearest neighbor algorithm, and/or any other suitable classifier). In some embodiments, the relative motion of the feature of the object can be represented in any suitable manner. For example, in some embodiments, the relative motion can be represented by a vector or a matrix of any suitable size, where each element of the vector or the matrix represents a position of the feature of the object. As another example, in some embodiments, the relative motion can be represented by a vector or a matrix of any suitable size, where each element of the vector or the matrix represents a change in position of the feature of the object since a previous measurement, as described above in more detail in connection with block 110.

Note that, in instances where process 100 uses a machine learning algorithm (e.g., a classifier, and/or any other suitable algorithm) to determine characteristics of a road, the algorithm can be trained using any suitable training data. For example, in some embodiments, an algorithm can be trained using a training set that includes any suitable number (e.g., 100, 1000, 10,000, and/or any other suitable number) of representations of relative motions of features of objects (e.g., vectors or matrices representing the relative motions) and a corresponding characteristic of the road from which the relative motion was measured (e.g., a speed bump, a pothole, an uphill, and/or any other suitable characteristic). As another example, in some embodiments, an algorithm can be trained using groups of images that each include a feature of an object in front of a vehicle (e.g., the images captured by a camera associated with a vehicle, as described above in connection with blocks 102 and 106) and a corresponding characteristic of the road from which the images were captured. Note that, in instances where a machine learning algorithm is trained with a training set, examples included in the training set can be manually tagged to indicate a characteristic of the road corresponding to each training example. Additionally, note that, in some embodiments, an algorithm can be updated over time in any suitable manner. For example, in some embodiments, a driver of a vehicle can be asked by process 100 if a determined characteristic of a road is correct (e.g., by asking if the vehicle went over a speed bump or pothole, by asking if the vehicle went up a hill, and/or requesting confirmation of a determined characteristic of a road in any other suitable manner), and can use the response in connection with the images captured at blocks 102 and 106 and/or the relative motion determined at block 110 as a new training sample for the algorithm.

Note that, in some embodiments, block 110 can be omitted, that is, an algorithm may implicitly determine a relative motion without the relative motion being explicitly calculated, as described above in connection with block 110. For example, in some embodiments, the algorithm can receive any suitable inputs as described above, such as one or more images that include a feature of an object in front of a vehicle, as described above, and the algorithm may implicitly determine a relative motion of the feature of the object based on the one or more images as a part of determining a characteristic of the road.

In some embodiments, process 100 can update parameters of the vehicle based on the determined surface characteristic of the road the vehicle is on at 114. For example, in an instance where process 100 determines that the characteristic of the road is an upcoming speed bump, pothole, or other surface abnormality, process 100 can adjust a suspension system of the vehicle prior to the vehicle encountering the surface abnormality. As a more particular example, in some embodiments, process 100 can adjust an actuator of an active suspension system prior to the vehicle encountering the upcoming abnormality or surface characteristic. As another example, in an instance where the characteristic of the road is a downhill slope of the road, process 100 can pre-charge brakes associated with the vehicle (e.g., by causing brake fluid to be moved through a brake fluid line, and/or in any other suitable manner) prior to the vehicle moving down the downhill slope. As yet another example, in an instance where the characteristic of the road is an uphill slope of the road and where the vehicle is operating in an autonomous or semi-autonomous mode, process 100 can apply gas as the vehicle approaches the uphill slope.

Note that, in some embodiments, process 100 can store a determined characteristic of a road for any suitable use. For example, in some embodiments, process 100 can store a characteristic that indicates a determined terrain (e.g., an uphill, a downhill, a turn, and/or any other suitable terrain), and process 100 can use the determined terrain in the future. As a more particular example, in some embodiments, at a future time in an instance where an object is no longer in front of the vehicle, process 100 can continue to use the determined terrain to update parameters of the vehicle, as described above in connection with block 114. As another example, in some embodiments, process 100 can transmit an indication of the determined characteristic to a server (e.g., server 202 as shown in and described below in connection with FIG. 2), and the server can transmit an indication of the determined characteristic to other vehicles. As a more particular example, in an instance where process 100 identifies an upcoming characteristic of a road (e.g., an upcoming surface irregularity such as a pothole, an upcoming hill, and/or any other suitable characteristic), the server can transmit the characteristic to any vehicles on the road that are likely to encounter the upcoming characteristic (e.g., based on current locations of the vehicles, based on current lanes of the vehicles, and/or based on any other suitable information or combination of information).

Note that, in some embodiments, process 100 can determine a characteristic of a road based on multiple objects (e.g., two objects, three objects, ten objects, and/or any other suitable number of objects). Additionally, in some embodiments, an object used to determine a characteristic of a road may be stationary, such as one or more traffic lights in front of a vehicle, one or more street lamps on a side of a road, and/or any other suitable object(s). For example, in some embodiments, process 100 can determine a characteristic of a road, such as a terrain of a road, based on positions of multiple objects. As a more particular example, in an instance where process 100 identifies multiple upcoming traffic lights (e.g., as captured in one or more images, as described above in connection with blocks 102 and/or 106), process 100 can determine that a position of each traffic light is higher than a previous traffic light, and can therefore determine that there is an upcoming uphill. As another more particular example, in an instance where process 100 identifies multiple street lamps on a side of a road (e.g., as captured in one or more images, as described above in connection with blocks 102 and/or 106), process 100 can determine that a position of each street lamp is lower than a preceding street lamp, and can therefore determine that there is an upcoming downhill.

Figure 2:
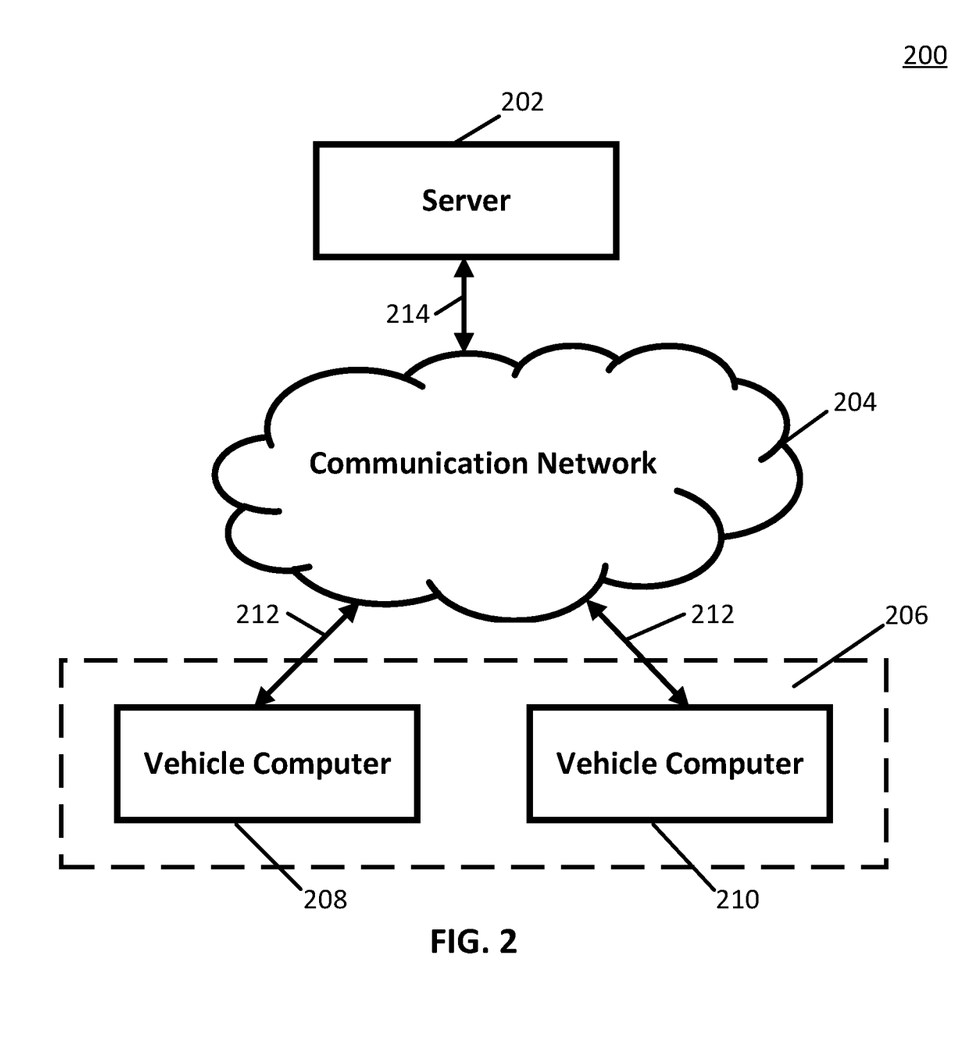
FIG. 2 shows a schematic diagram of an illustrative system suitable for implementation of mechanisms described herein for determining characteristics of roads in accordance with some embodiments of the disclosed subject matter.

Turning to FIG. 2, an example 200 of hardware for determining characteristics of a road that can be used in accordance with some embodiments of the disclosed subject matter is shown. As illustrated, hardware 200 can include a server 202, a communication network 204, and/or one or more vehicle computers 206, such as vehicle computers 208 and 210.

Server 202 can be any suitable server(s) for storing information, data, and/or programs used to determine surface information of a road. For example, in some embodiments, server 202 can store parameters used by a classifier to determine a characteristic of a road, as described above in connection with FIG. 1. In some embodiments, server 202 can be omitted.

Communication network 204 can be any suitable combination of one or more wired and/or wireless networks in some embodiments. For example, communication network 204 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. Vehicle computers 206 can be connected by one or more communications links (e.g., communications links 212) to communication network 204 that can be linked via one or more communications links (e.g., communications links 214) to server 202. The communications links can be any communications links suitable for communicating data among vehicle computers 206 and server 202 such as network links, dial-up links, wireless links, hard-wired links, any other suitable communications links, or any suitable combination of such links.

Vehicle computers 206 can include any one or more computing devices operating on a vehicle, such as a car, truck, etc. In some embodiments, vehicle computers 206 can perform any suitable functions, such as determining a characteristic of a road the vehicle is traveling on, as described above in connection with FIG. 1, and/or performing any other suitable functions. For example, as described above in connection with FIG. 1, in some embodiments, vehicle computers 206 can capture images that include a feature of an object in front of the vehicle (e.g., a taillight of a second vehicle in front of the vehicle, and/or any other suitable feature), and can determine a characteristic of the road based on a relative motion of the feature of the object as it moves over the road.

Although server 202 is illustrated as one device, the functions performed by server 202 can be performed using any suitable number of devices in some embodiments. For example, in some embodiments, multiple devices can be used to implement the functions performed by server 202.

Although two vehicle computers 208 and 210 are shown in FIG. 2 to avoid over-complicating the figure, any suitable number of vehicle computers, and/or any suitable types of vehicle computers, can be used in some embodiments.

Server 202 and vehicle computers 206 can be implemented using any suitable hardware in some embodiments. For example, in some embodiments, devices 202 and 206 can be implemented using any suitable general purpose computer or special purpose computer. For example, a vehicle computer may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Figure 3:
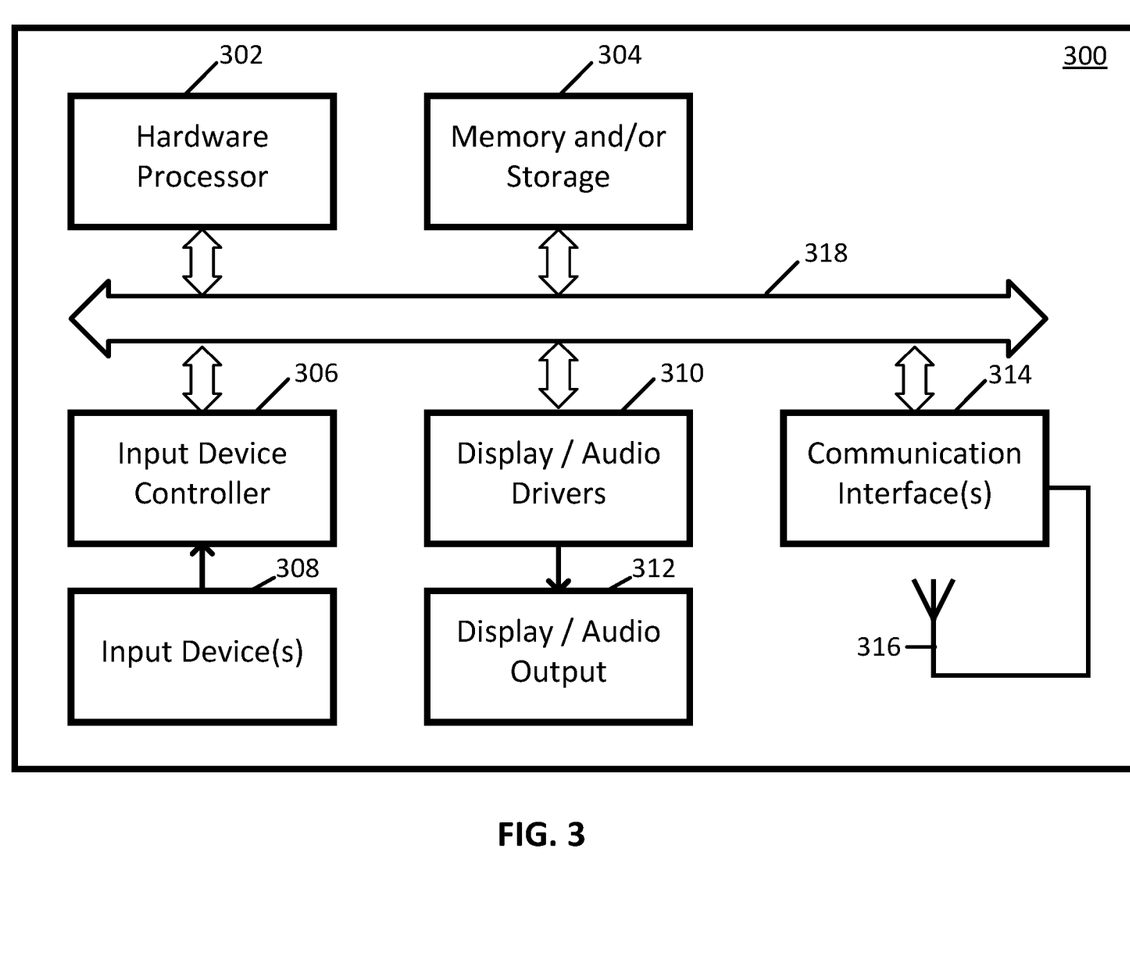
FIG. 3 shows a detailed example of hardware that can be used in a server and/or a vehicle computer of FIG. 2 in accordance with some embodiments of the disclosed subject matter.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage of a server, such as server 202. For example, in some embodiments, the server program can cause hardware processor 302 to transmit parameters for determining surface features of a road to vehicle computer 206, update parameters for determining surface features of a road, and/or perform any other suitable functions. In some embodiments, hardware processor 302 can be controlled by a computer program stored in memory and/or storage 304 of vehicle computer 206. For example, the computer program can cause hardware processor 302 to detect a feature of an object in front of a vehicle, determine a surface characteristic of a road the vehicle is on based on the changing position of the feature of the object, modify a state of the vehicle based on the surface characteristic (e.g., change a current suspension of the vehicle, pre-charge brakes of the vehicle, etc.), and/or perform any other suitable functions.

Memory and/or storage 304 can be any suitable memory and/or storage for storing programs, data, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks (e.g., computer network 204). For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

In some embodiments, at least some of the above described blocks of the process of FIG. 1 can be executed or performed in any order or sequence not limited to the order and sequence shown in and described in connection with the figure. Also, some of the above blocks of FIG. 1 can be executed or performed substantially simultaneously where appropriate or in parallel to reduce latency and processing times. Additionally or alternatively, some of the above described blocks of the process of FIG. 1 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for determining characteristics of roads are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for determining characteristics of roads, comprising:
   receiving, at a first time point, first camera information from a camera associated with a vehicle;
   identifying a first position of a feature of an object in front of the vehicle based on the first camera information;
   receiving, at one or more additional time points, additional camera information from the camera;
   identifying one or more updated positions of the feature of the object in front of the vehicle based on the additional camera information;
   inserting position information of the feature of the object in front of the vehicle into one of a vector and a matrix, wherein the position information is one of 1) the first position and the one or more updated positions and 2) changes of position of the object in front of the vehicle determined based on the first position and the one or more updated positions;
   identifying a characteristic of a road the vehicle is on based on the one of the vector and the matrix using a trained machine learning algorithm, wherein the trained machine learning algorithm comprises a classification algorithm with the one of the vector and the matrix as input and the identified characteristic of the road as output and utilizing a training set of position information from prior motions of features of objects captured and inserted into one of a vector and a matrix and resulting identified characteristics of roads determined therefrom; and
   changing one or more of a suspension parameter, an acceleration parameter, and a braking parameter of the vehicle based on the identified characteristic of the road received from the trained machine learning algorithm.

2. The method of claim 1, wherein the object in front of the vehicle is a second vehicle.

3. The method of claim 2, wherein the feature of the object in front of the vehicle is a taillight of the second vehicle.

4. The method of claim 1, wherein the characteristic of the road is an irregularity of a surface of the road.

5. The method of claim 1, wherein the characteristic of the road is a change in terrain.

6. The method of claim 1, wherein changing the one or more of the suspension parameter, the acceleration parameter, and the braking parameter of the vehicle comprises changing the suspension parameter of an active suspension system of the vehicle.

7. The method of claim 1, wherein changing the one or more of the suspension parameter, the acceleration parameter, and the braking parameter of the vehicle comprises changing the suspension parameter and adjusting an actuator of an active suspension system of the vehicle accordingly.

8. A system for determining characteristics of roads, the system comprising:
   a hardware processor that is programmed to:
     receive, at a first time point, first camera information from a camera associated with a vehicle;
     identify a first position of a feature of an object in front of the vehicle based on the first camera information;
     receive, at one or more additional time points, additional camera information from the camera;
     identify one ore more updated positions of the feature of the object in front of the vehicle based on the additional camera information;
     insert position information of the feature of the object in front of the vehicle into one of a vector and a matrix, wherein the position information is one of 1) the first position and the one or more updated positions and 2) changes of position of the object in front of the vehicle determined based on the first position and the one or more updated positions;
     identify a characteristic of a road the vehicle is on based on the one of the vector and the matrix using a trained machine learning algorithm, wherein the trained machine learning algorithm comprises a classification algorithm with the one of the vector and the matrix as input and the identified characteristic of the road as output and utilizing a training set of position information from prior motions of features of objects captured and inserted into one of a vector and a matrix and resulting identified characteristics of roads determined therefrom; and
     change one or more of a suspension parameter, an acceleration parameter, and a braking parameter of the vehicle based on the identified characteristic of the road received from the trained machine learning algorithm.

9. The system of claim 8, wherein the object in front of the vehicle is a second vehicle.

10. The system of claim 9, wherein the feature of the object in front of the vehicle is a taillight of the second vehicle.

11. The system of claim 8, wherein the characteristic of the road is an irregularity of a surface of the road.

12. The system of claim 8, wherein the characteristic of the road is a change in terrain.

13. The system of claim 8, wherein changing the one or more of the suspension parameter, the acceleration parameter, and the braking parameter of the vehicle comprises changing the suspension parameter of an active suspension system of the vehicle.

14. The system of claim 8, wherein changing the one or more of the suspension parameter, the acceleration parameter, and the braking parameter of the vehicle comprises changing the suspension parameter and adjusting an actuator of an active suspension system of the vehicle accordingly.

15. A non-transitory computer-readable medium containing computer executable instructions that, when executed by a processor, cause the processor to perform a method for determining characteristics of roads, the method comprising:
    receiving, at a first time point, first camera information from a camera associated with a vehicle;
    identifying a first position of a feature of an object in front of the vehicle based on the first camera information;
    receiving, at one or more additional time points, additional camera information from the camera;
    identifying one or more updated positions of the feature of the object in front of the vehicle based on the additional camera information;
    inserting position information of the feature of the object in front of the vehicle into one of a vector and a matrix, wherein the position information is one of 1) the first position and the one of more updated positions and 2) changes of position of the object in front of the vehicle determined based on the first position and the one or more updated positions;
    identifying a characteristic of a road the vehicle is on based on the one of the vector and the matrix using a trained machine learning algorithm, wherein the trained machine learning algorithm comprises a classification algorithm with the one of the vector and the matrix as input and the identified characteristic of the road as output and utilizing a training set of position information from prior motions of features of objects captured and inserted into one of a vector and a matrix and resulting identified characteristics of roads determined therefrom; and
    changing one or more of a suspension parameter, an acceleration parameter, and a braking parameter of the vehicle based on the identified characteristic of the road received from the trained machine learning algorithm.

16. The non-transitory computer-readable medium of claim 15, wherein the object in front of the vehicle is a second vehicle.

17. The non-transitory computer-readable medium of claim 16, wherein the feature of the object in front of the vehicle is a taillight of the second vehicle.

18. The non-transitory computer-readable medium of claim 15, wherein the characteristic of the road is an irregularity of a surface of the road.

19. The non-transitory computer-readable medium of claim 15, wherein the characteristic of the road is a change in terrain.

20. The non-transitory computer-readable medium of claim 15, wherein changing the one or more of the suspension parameter, the acceleration parameter, and the braking parameter of the vehicle comprises changing the suspension parameter of an active suspension system of the vehicle.

21. The non-transitory computer-readable medium of claim 15, wherein changing the one or more of the suspension parameter, the acceleration parameter, and the braking parameter of the vehicle comprises changing the suspension parameter and adjusting an actuator of an active suspension system of the vehicle accordingly.

* * * * *